(12) United States Patent
Guha et al.

(10) Patent No.: US 9,843,076 B2
(45) Date of Patent: Dec. 12, 2017

(54) ENERGY CELL TEMPERATURE MANAGEMENT

(71) Applicants: Probir Kumar Guha, Troy, MI (US); Michael J. Siwajek, Rochester Hills, MI (US); Michael Joseph Hiltunen, Westland, MI (US); Swati Neogi, East Brunswick, NJ (US); Jack Douglas Dunagan, Troy, MI (US); Adam Craig Burley, Rochester Hills, MI (US)

(72) Inventors: Probir Kumar Guha, Troy, MI (US); Michael J. Siwajek, Rochester Hills, MI (US); Michael Joseph Hiltunen, Westland, MI (US); Swati Neogi, East Brunswick, NJ (US); Jack Douglas Dunagan, Troy, MI (US); Adam Craig Burley, Rochester Hills, MI (US)

(73) Assignee: CONTINENTAL STRUCTURAL PLASTICS, INC., Troy, MI (US)

(*) Notice: Subject to any disclaimer, the term of this patent is extended or adjusted under 35 U.S.C. 154(b) by 884 days.

(21) Appl. No.: 13/651,907

(22) Filed: Oct. 15, 2012

(65) Prior Publication Data
US 2014/0106198 A1    Apr. 17, 2014

Related U.S. Application Data

(60) Provisional application No. 61/549,442, filed on Oct. 20, 2011.

(51) Int. Cl.
*B65D 85/88* (2006.01)
*H01M 10/659* (2014.01)
(Continued)

(52) U.S. Cl.
CPC ........ *H01M 10/5089* (2013.01); *F28D 20/02* (2013.01); *F28D 20/023* (2013.01);
(Continued)

(58) Field of Classification Search
CPC ........... H01M 10/5089; H01M 10/502; H01M 10/659; H01M 2/1077; H01M 2/1094; F28D 20/02; F28D 20/023; Y02E 60/145
(Continued)

(56) References Cited

U.S. PATENT DOCUMENTS 4,483,889 A * 11/1984 Andersson ................. 427/389.9
5,709,914 A *  1/1998 Hayes ....................... B32B 1/02
                                              428/109
(Continued)

FOREIGN PATENT DOCUMENTS

CN    101267056 A    9/2008
CN    101546843 A    9/2009
(Continued)

*Primary Examiner* — J. Gregory Pickett
*Assistant Examiner* — Niki M Eloshway
(74) *Attorney, Agent, or Firm* — Avery N. Goldstein; Blue Filament Law PLLC

(57) ABSTRACT

A temperature regulation and management system is provide that has an inner wall and an outer wall forming a space for accommodating a phase change material (PCM) with the space between the walls, in one or both of the walls, or a combination of such locations. The inner wall is in contact with an object that requires temperature regulation within a specified operating range, such as a vehicle battery pack. The inner wall and the outer wall are both formed from sheet molding compound (SMC), or the outer wall if formed of a filled polyurethane.

10 Claims, 3 Drawing Sheets

(51) Int. Cl.
*H01M 2/10* (2006.01)
*F28D 20/02* (2006.01)
*B65D 6/10* (2006.01)

(52) U.S. Cl.
CPC ....... *H01M 2/1077* (2013.01); *H01M 2/1094* (2013.01); *H01M 10/659* (2015.04); *Y02E 60/145* (2013.01)

(58) Field of Classification Search
USPC ............... 429/120; 220/62.19, 592.01, 62.15
See application file for complete search history.

(56) References Cited

U.S. PATENT DOCUMENTS

| | | | | |
|---|---|---|---|---|
| 6,004,662 | A * | 12/1999 | Buckley | 428/304.4 |
| 6,083,418 | A | 7/2000 | Czarnecki et al. | |
| 8,587,945 | B1 * | 11/2013 | Hartmann et al. | 361/708 |
| 2001/0033961 | A1 | 10/2001 | Gudmundsson et al. | |
| 2006/0025878 | A1 | 2/2006 | Ferren et al. | |
| 2006/0063066 | A1 * | 3/2006 | Choi et al. | 429/120 |
| 2007/0292751 | A1 | 12/2007 | Cherng et al. | |
| 2009/0004556 | A1 | 1/2009 | Al-Hallaj et al. | |
| 2010/0204360 | A1 | 8/2010 | Beach et al. | |
| 2010/0273041 | A1 | 10/2010 | Lawall et al. | |
| 2011/0151301 | A1 | 6/2011 | Kim | |
| 2011/0159340 | A1 * | 6/2011 | Hu et al. | 429/120 |
| 2011/0248038 | A1 * | 10/2011 | Mayer | 220/592.27 |
| 2011/0262793 | A1 * | 10/2011 | Reis et al. | 429/120 |
| 2011/0293986 | A1 * | 12/2011 | Kozu | 429/120 |
| 2014/0054196 | A1 * | 2/2014 | Schaefer | H01M 2/1005 206/703 |
| 2014/0152264 | A1 * | 6/2014 | Schaefer et al. | 320/128 |

FOREIGN PATENT DOCUMENTS

| | | |
|---|---|---|
| CN | 201378601 Y | 1/2010 |
| DE | 10134145 A1 | 2/2003 |
| GB | 2289976 A | 6/1995 |
| JP | 2010073406 A | 4/2010 |
| WO | 2006014061 A1 | 2/2006 |
| WO | 2011064956 A1 | 6/2011 |
| WO | 2011072988 A1 | 6/2011 |

\* cited by examiner

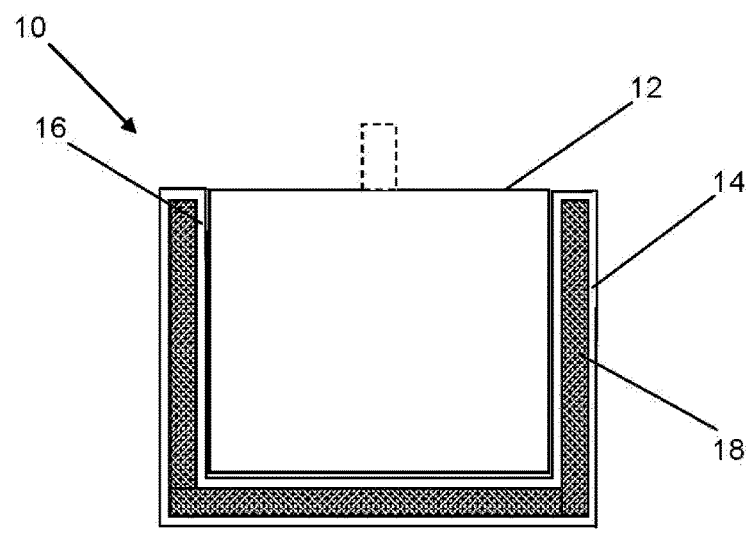
FIG. 3
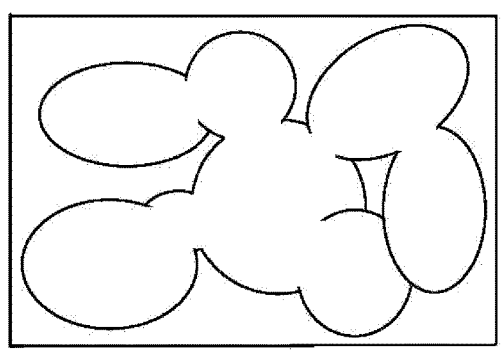
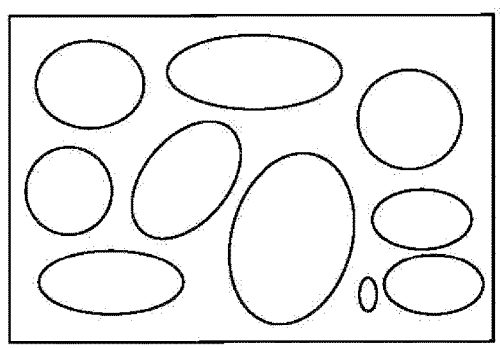
FIG. 4A                FIG. 4B

US 9,843,076 B2

ENERGY CELL TEMPERATURE MANAGEMENT

This utility application claims priority benefit of U.S. Provisional application Ser. No. 61/549,442 of the same title and filed on 20 Oct. 2012; the contents of which are hereby incorporated by reference.

FIELD OF THE INVENTION

The present invention in general relates to temperature regulation and management and in particular to a system for maintaining the operating temperature range of energy cells.

BACKGROUND OF THE INVENTION

The operating environment of an energy cell or battery can appreciably affect its output efficiency and lifespan. For example, batteries generate more power per recharge, have a greater peak power, have a longer operating interval between recharges, and have a greater operational lifespan when used within a moderate range of temperatures. When exposed to sub-optimal or cooler temperatures, battery efficiency is reduced, potentially lowering the energy output, such as the voltage and current supplied. Conversely, prolonged exposure to temperatures above an optimal range may shorten battery life.

Most batteries generate power with an electrolytic process in a liquid solution. If the temperature of the battery is above a preferred operating temperature range associated with the battery, the liquid will quickly dry out and electrodes of the battery will be damaged or worn out. Peaks in the temperature of the battery, even of relatively short durations, can therefore shorten the operating lifetime of the battery immensely. If, instead, the battery temperature is below the preferred operating temperature range, performance of a galvanic process in the battery is degraded, thereby causing a decrease in voltage and charge holding capacity of the battery. Consequently, the battery will have to be recharged more often, resulting in a reduction in the operational life of the electrodes of the battery.

Phase change materials (PCM) are commonly used to manage and regulate the temperature of objects in relation to the object's ambient environment. A PCM has an appreciable latent heat of fusion, and is formulated to have a constant melting temperature ($T_m$) within the desired operating temperature range of the object to be regulated. Depending upon ambient temperatures and/or temperatures within the object, the PCM absorbs heat from, or releases heat to the object as needed at a substantially constant melting temperature, $T_m$, to provide the object with improved temperature stability, maintaining it for longer periods of time within its optimal operating temperature range. In general, when PCMs reach the temperature at which they change phase (their melting temperature) they absorb large amounts of heat at an almost constant temperature. The PCM continues to absorb heat without a significant rise in temperature until all the material is transformed to the liquid phase. When the ambient temperature around a liquid material falls, the PCM solidifies, releasing its stored latent heat.

Electric and hybrid vehicles, powered with energy cells employing battery technologies, are subjected to a wide range of temperatures above and below the optimal operating conditions of the vehicle batteries. PCM, which have $T_m$ optimized for the optimal operating temperature range of batteries used in vehicles of approximately 80 F, are generally salt hydrates which are highly corrosive to their containment materials.

Thus, there exists a need for materials that are more robust than thermoplastics for containing PCM in temperature regulation and management applications. Furthermore, there exists a need for materials for holding the PCM that optimizing the performance of the PCM in regulating and managing temperatures.

SUMMARY OF THE INVENTION

A temperature regulation and management system is provide that has an inner wall and an outer wall forming a space for accommodating a phase change material (PCM) with the space between the walls, in one or both of the walls, or a combination of such locations. The inner wall is in contact with an object that requires temperature regulation within a specified operating range, such as a vehicle battery pack. The inner wall and the outer wall are both formed from sheet molding compound (SMC), or the outer wall if formed of a filled polyurethane.

BRIEF DESCRIPTION OF THE DRAWINGS

FIG. 3 is a cross-sectional view of the system of FIG. 1 along line 3-3 illustrating the two energy cells surrounded by a region of phase change material (PCM) between double walls formed from sheet molding compound (SMC);

FIGS. 4A and 4B illustrate a cross-section of open cell and closed cell foam, respectively for holding a PCM.

DETAILED DESCRIPTION OF THE PREFERRED EMBODIMENTS

Figure 1:
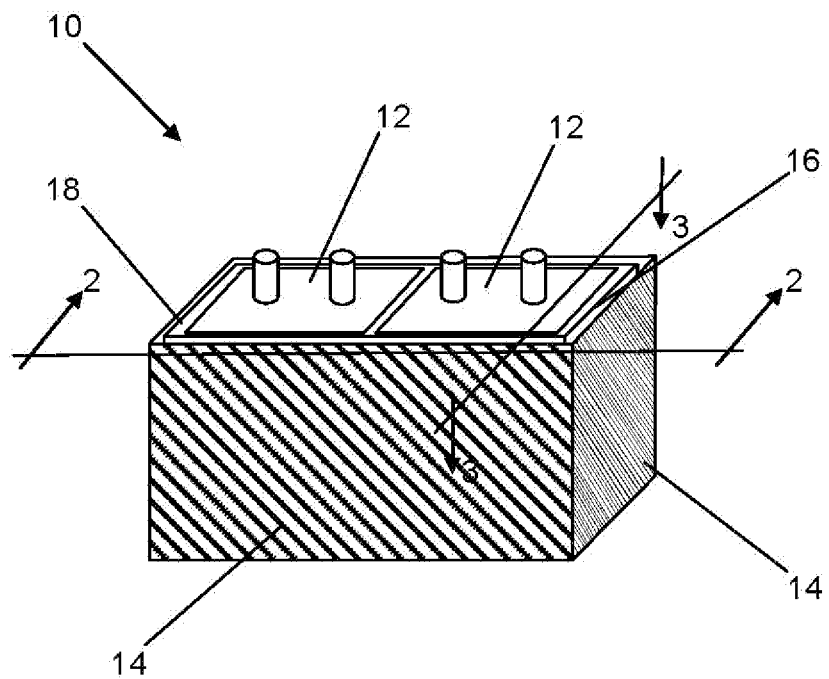
FIG. 1 is a perspective view of an inventive temperature regulation and management system with two energy cells.

The present invention has utility as a temperature regulation and management system for maintaining the operating temperature range of energy cells under changing ambient conditions. A phase change material (PCM) is used to regulate the operating temperature of one or more energy cells or batteries. The PCM is confined to a region defined by walls formed from sheet molding compound (SMC). Properties of the PCM and SMC are varied according to the operating requirements of the energy cells, and expected ambient conditions.

Sheet molding compound (SMC) or bulk molding compound (BMC) are materials with robust properties that are able to withstand the long term corrosive effects of PCM. Bulk molding compound (BMC) or bulk molding composite is a ready to mold, fiber reinforced thermoset polyester material primarily used in injection molding and compression molding. The BMC material is provided in bulk or logs. BMC is manufactured by mixing strands (>1") of chopped glass fibers in a mixer with polyester resin. The glass fibers in BMC result in better strength properties than standard thermoplastic products. Typical applications include demanding electrical applications, corrosion resistant needs, appliance, automotive, and transit.

Sheet molding compound (SMC) or sheet molding composite is a ready to mold fiber-reinforced polyester material primarily used in compression molding. SMC is a reinforced composite material that is manufactured by dispersing long strands (>1") of chopped glass fibers in a bath of polyester resin. The longer glass fibers in SMC result in better strength properties than standard BMC products. SMC and BMC materials are used herein for the containment of the PCM component of an inventive system based on the corrosion resistance, low cost, common usage in vehicles, and the tunable properties that are engineered into the material.

In order to reduce the density of a sheet molding compound (SMC) or bulk molding compound (BMC) for the present invention, high-density inorganic fillers, such as calcium carbonate, are preferably removed from the formulation and replaced with lower density plastic particulate; natural fillers such as walnut shell powder; coconut shell powder, and the like; plastic hollow microspheres, hollow glass microspheres, or gas entrainment within the SMC or BMC matrix to lower the vehicle weight and thereby increase fuel efficiency.

A molding composition formulation, as disclosed in U.S. Patent Application Publication 2006025878 filed Nov. 16, 2006 and U.S. Patent Application Publication 20100204360 filed Aug. 12, 2010 and herein included by reference in their entirety, includes a thermoset cross-linkable polymeric resin.

Typically, an inventive SMC or BMC matrix is filled between 20 and 60 volume percent with various fillers as detailed above and including, natural fillers, thermoplastic filler, metallic particulate, void volume or a combination thereof. Microspheroids, regardless of whether solid or hollow, glass or thermoplastic or metal, have a mean diameter of from 3 to 150 microns. An article formed from such a composition is further strengthened by the addition of a surface activating agent bonded to the surface of the glass microspheroids. Additionally, conventional particulate fillers when added to an inventive formulation provide enhanced performance when the filler particle has a size sufficiently small to insert within adjacent microspheroid interstitial voids.

A process for producing a PCM containment housing of an inventive system from a molding composition formulation includes adding a quantity of microspheres or entraining gas in the molding composition formulation containing an uncured thermoset cross-linkable polymeric resin. Upon allowing sufficient time for the resin to cross link, a molded article is produced. An unsaturated polyester resin is particularly well suited for the formation of sheet molding compound formulations.

As used herein a microspheroid is defined to include a hollow microsphere or a solid bead having an aspect ratio of between two normal diameters of between 1 and 1.6 and is formed of glass, metal, or a thermoplastic material. It is appreciated that the thermal transfer attributes of a metal particle are readily modified by forming a discoid and such flattened metallic particulate is intended to be encompassed within the scope this definition.

Preferably, the microspheroids have a mean diameter of between 3 and 150 microns. Most preferably, the microspheroids have an outer dimension of between 16 and 85 microns. Typically, microspheroids are loaded into a base SMC or BMC formulation from 5 to 60 volume percent of the resulting formulation and on average are about 35 volume percent when present. The specific amount of microspheroids added into a given molding composition formulation is dependent on factors including desired article density, microspheroid size dispersion and mean particle dimension, thermal transfer properties, and required article strength. It is appreciated that the specific percentage of a given filler depends on density and also fiber content. Typically, the filler volume is coming around 9% to 50% for fillers of density 0.2 to 2.71 based on a glass percentage of about 20% by volume.

In embodiments of the invention, properties of the double SMC walls for holding the PCM may be varied to optimize the thermal characteristics for temperature regulation in concert with the PCM. In other embodiments, the inner wall is SMC and the outer wall is formed of a polyurethane polymer matrix in foamed or densified form. The characteristic properties of the SMC may be controlled with the introduction of glass microspheroids and air entrainment in SMC, and the general nature of inter-wall SMC composition. Wall properties that may be varied include thickness, thermal conductivity, and specific heat. In a double wall construction of an inventive PCM containment housing the inner and outer wall properties are individually set to maximize the inventive thermal performance.

A typical range for the wall thicknesses for each of the SMC walls may be from about 0.06 inches to 0.5 inches with a nominal value of 0.125 inches. The specific heat capacity of the SMC may vary from 0.038 BTU/LB-° F. to 3.8 BTU/LB-° F. with a nominal value of 0.38 BTU/LB-° F. The thermal conductivity of the SMC may vary from 0.153 BTU-in/ft-$^2$-hr-° F. to 2.0 BTU-in/ft$^2$-hr-° F. with a nominal value of 1.53 BTU-in/ft$^2$-hr-° F. It is appreciated that the void volume of the inner and outer walls is varied to modify the thermal properties of the inventive system.

In embodiments of the invention, properties of the PCM that are varied include thickness (inter-wall spacing), liquid phase properties, solid phase properties, melting point, and latent heat of fusion. Liquid and solid phase properties may include thermal conductivity and specific heat. By way of example, a PCM operative herein is based on the solid to liquid phase transformation of trimethylolethane (TME) hydrate with the following characteristic property (63% w/w)+H$_2$O (37% w/w) and a melting point of 75° F.

Typical ranges for the solid phase of the PCM are as follows. Thickness of the space between the SMC walls for the solid phase PCM typically varies between 0.25 and 10 inches, based on the desired heat capacity of the inventive system. The specific heat capacity of the solid phase PCM typically varies from 0.0275 BTU/lb-° F. to 10.00 BTU/lb-° F. with a nominal value of 2.75 KJ/Kg-° K. The thermal conductivity of the solid phase PCM typically varies from 0.01 W/m-° K to 1.0 W/m-° K with a nominal value of 0.1 W/m-° K. The latent heat of fusion of the solid phase PCM may range from 50 KJ/Kg to 500 KJ/Kg with a nominal value of 220 KJ/Kg. The specific heat capacity of the liquid phase PCM typically varies from 0.0275 BTU/lb-° F. to 10.00 BTU/lb-° F. with a nominal value of 3.58 KJ/Kg-° K.

FIG. 1 is a perspective view of an inventive temperature regulation and management system 10 with two energy cells 12. The energy cells 12 may have one or more exterior walls 14 and interior walls 16 formed from SMC for containing the PCM 18. For example, only a single wall of the energy cell 12 may be contact with the temperature regulation and management system 10. In the examples illustrated in FIGS. 1-3, the energy cells 12 are surrounded on all four sides by the temperature regulation and management system 10. The thicknesses of the exterior walls 14 and interior walls 16 may be identical, or independent of each other. Optionally, one of the walls 14 or 16 is configured to produce a heat radiating fin or plurality of fins to facilitate thermal transfer between the exterior and the cells 12, respectively. Such fins are conventional to the art in form and not depicted for visual clarity. As described above the characteristic parameters of the SMC may also be independently varied within the ranges denoted above. In alternative embodiments for other applications of the temperature regulation and management system 10, the ranges and parameters may be different. The PCM 18 characteristic parameters may also be varied within the ranges denoted above. Depending on the application, the PCM material and the resultant characteristic parameters may be entirely different.

Figure 2:
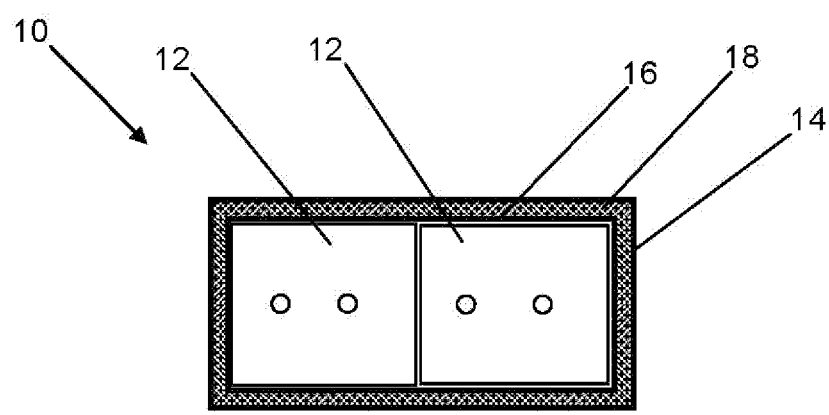
FIG. 2 is a cross-sectional view of the system of FIG. 1 along line 2-2 illustrating the two energy cells surrounded by a region of phase change material (PCM) between double walls formed from sheet molding compound (SMC)

FIG. 2 is a top down cross-sectional view of the system of FIG. 1 along line 2-2 illustrating the two energy cells 12 surrounded by a region of PCM 18 between double walls (exterior 14 and interior 16) formed from SMC.

FIG. 3 is a cross-sectional view of the system of FIG. 1 along line 3-3 illustrating the two energy cells 12 surrounded by a region of PCM 18 between double walls (exterior 14 and interior 16) formed from SMC.

FIGS. 4A and 4B illustrate a cross-section of open cell and closed cell foam, respectively for holding a PCM. Open cell foam as shown in FIG. 4A is a sponge like material where cells or cavities are in communication with each other. In the open cell foam, the PCM permeates throughout the foam. Closed cell foams as shown in FIG. 4B, have individual cavities or voids that are not in communication with each other. In closed cell foam, the PCM is suspended in the individual cells or voids.

Figure 5:
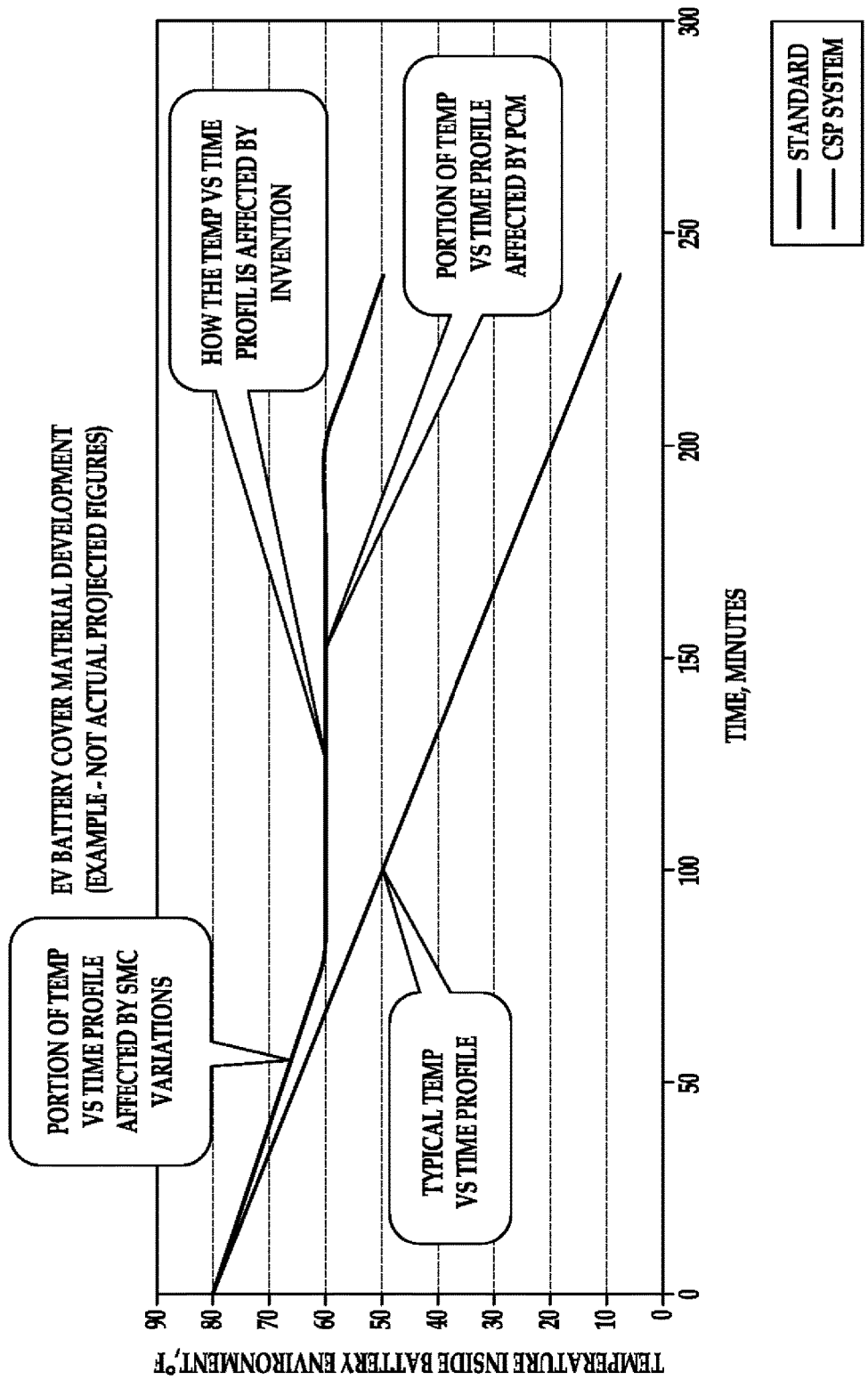
FIG. 5 is a plot of temperature as a function of time for an inventive system as compared to a conventional battery lacking an inventive PCM and specially formulated SMC housing for the PCM.

FIG. 5 is a plot of temperature as a function of time for an inventive system as compared to a conventional battery lacking an inventive PCM demonstrating the temperature maintenance obtained, an improvement in battery performance follows the temperature stabilization.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A temperature regulation and management system for a vehicle, said system comprising:
   an inner wall and an outer wall forming a space therebetween for accommodating a phase change material (PCM), the space being between 0.25 and 10 inches;
   wherein said inner wall is in contact with an object that is one or more energy cells or batteries of the vehicle for temperature regulation within a specified operating range including a melting temperature of said PCM for a time of at least two hours, said inner wall having a thickness of 0.06 inches to 0.5 inches;
   wherein said inner wall is formed from sheet molding compound (SMC) containing chopped fiber and said outer wall is formed of the SMC or a polyurethane polymer matrix and having a thickness of 0.06 inches to 0.5 inches.

2. The system of claim 1 wherein said PCM is trimethylolethane (TME).

3. The system of claim 1 wherein said PCM is suspended in an open cell foam.

4. The system of claim 1 wherein said PCM is suspended in a closed cell foam.

5. The system of claim 1 wherein the thickness of said PCM is varied between said inner and outer wall.

6. The system of claim 1 wherein said SMC is formed with glass-micro spheroids, thermoplastic-micro spheroids, metallic-micro spheroids, or a combination thereof.

7. The system of claim 1 wherein said SMC has air entrainment.

8. The system of claim 1 wherein the thickness of said inner and outer walls have thicknesses independent of each other.

9. The system of claim 1 wherein said object has one or more faces in contact with said inner wall.

10. The system of claim 1 wherein at least one of said inner wall and said outer wall has at least one fin projecting therefrom.

\* \* \* \* \*